United States Patent
Kay et al.

(10) Patent No.: US 9,451,039 B1
(45) Date of Patent: Sep. 20, 2016

(54) PUSH NOTIFICATIONS FOR WEB APPLICATIONS AND BROWSER EXTENSIONS

(71) Applicant: GOOGLE INC., Mountain View, CA (US)

(72) Inventors: Erik Kay, Emerald Hills, CA (US); Antony John Sargent, Mountain View, CA (US); Alexandra Levich, Mountain View, CA (US); Munjal Doshi, Sammamish, WA (US); Zhenhai Lin, Kirkland, WA (US); Glen Murphy, Palo Alto, CA (US); Rahul Roy-Chowdhury, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/250,877

(22) Filed: Apr. 11, 2014

Related U.S. Application Data (63) Continuation of application No. 13/415,439, filed on Mar. 8, 2012, now Pat. No. 8,739,249.

(51) Int. Cl.
    *H04L 29/06* (2006.01)
    *G06F 21/00* (2013.01)
    *H04L 29/08* (2006.01)
    *H04W 4/14* (2009.01)

(52) U.S. Cl.
    CPC ............... *H04L 67/26* (2013.01); *H04L 63/08* (2013.01)

(58) Field of Classification Search
    CPC .................. H04L 67/26; H04L 63/08
    See application file for complete search history.

(56) References Cited

U.S. PATENT DOCUMENTS

| 8,181,254 | B1 | 5/2012 | Kay et al. | |
|---|---|---|---|---|
| 2002/0057285 | A1 | 5/2002 | Nicholas | |
| 2011/0286586 | A1* | 11/2011 | Saylor et al. | 379/88.13 |
| 2012/0290740 | A1* | 11/2012 | Tewari et al. | 709/248 |

(Continued)

FOREIGN PATENT DOCUMENTS

| FR | WO 2014087094 A1 * | 6/2014 | H04W 4/14 |
|---|---|---|---|
| WO | 2013019685 A1 | 2/2013 | |

OTHER PUBLICATIONS

Giuseppe Ghiani, Fabio Paternò, Carmen Santoro; "Push and pull of web user interfaces in multi-device environments"; May 2012; AVI '12: Proceedings of the International Working Conference on Advanced Visual Interfaces; Publisher: ACM; pp. 10-17.*

(Continued)

*Primary Examiner* — Andrew Nalven
*Assistant Examiner* — Courtney Fields
(74) *Attorney, Agent, or Firm* — Brake Hughes Bellermann LLP (57) ABSTRACT

A system includes a memory configured to store executable code and a processor operably coupled to the memory. The processor is configured to execute the code to receive a request from a developer of a first web application to provide a notification corresponding to the first web application, authenticate the developer using a client identifier, after authenticating the developer, receive a content of the notification and a first user identifier, and provide the content of the notification to at least one of a plurality of computing devices associated with the first user identifier, based on an account associated with the first user identifier. The system syncs the notification and a plurality of computing devices associated with the first user identifier, based on the account.

20 Claims, 5 Drawing Sheets

(56) References Cited

U.S. PATENT DOCUMENTS

2013/0047034 A1* 2/2013 Salomon et al. ............... 714/18
2013/0067260 A1* 3/2013 Gatta et al. ................... 713/323

OTHER PUBLICATIONS

Gregg, "Web Notifications Overview", W3C Editor's Draft, Oct. 12, 2010, 3 pages.

"iOS: Understanding Notifications", support.apple.com/kb/HT3576, Oct. 12, 2011, 2 pages.

Marshall, et al., "That syncing feeling: early user experiences with the cloud", Proceedings of the Designing Interactive Systems Conference, Jun. 2012, pp. 544-553.

Non-Final Office Action for U.S. Appl. No. 13/415,439, mailed Mar. 27, 2013.

Non-Final Office Action Response for U.S. Appl. No. 13/415,439, filed Apr. 25, 2013, 13 pages.

Non-Final Office Action for U.S. Appl. No. 13/415,439, mailed Jul. 11, 2013.

Notice of Allowance for U.S. Appl. No. 13/415,439, mailed Feb. 26, 2014, 18 pages.

* cited by examiner

PUSH NOTIFICATIONS FOR WEB APPLICATIONS AND BROWSER EXTENSIONS

RELATED APPLICATION

This application is a continuation of, and claims priority to, U.S. patent application Ser. No. 13/415,439, filed on Mar. 8, 2012, entitled "Push Notifications for Web Applications and Browser Extensions," which is hereby incorporated by reference in its entirety.

TECHNICAL FIELD

This disclosure generally relates to notifications for web browser applications and web browser extensions.

BACKGROUND

A service website for an application can send a notification to a user, for example to notify a user about potential updates that are available for the application, about potential deals that are available for a group discount, or about stock updates. If the notifications are sent via-email, however, a user must view the notifications out of context of the application. Notifications may also be sent to a user's computing device via a server, but users with many different devices, such as smart phones, laptops, desktops, and tablets, may not automatically receive notifications on each computing device even if the user has installed the same application on each computing device. Further, notifications may require a user to separately launch the application to read or understand the notification. Additionally, a user carrying around a laptop in a bag all day generally does not receive notifications if the laptop is in a low power state.

SUMMARY

According to one general aspect, a computer-implemented method for providing notifications establishes, at a server, a plurality of user identifiers corresponding to users that have installed a first web application. The server receives a request from an application server to provide a notification related to the first web application. The server authenticates the application server, and after authenticating the application server, receives the notification and a first user identifier. The server provides the notification to at least one of a plurality of computing devices associated with the first user identifier. The server syncs the notification and a plurality of computing devices associated with the user identifier based on an account associated with the user identifier Implementations may include one or more of the following features, alone or in combination with each other. An open network connection is established between the at least one of the plurality of computing devices and the server, and a message is pushed from the server to the at least one of the plurality of computing devices when the request from the application server to provide the notification related to the first web application is received at the server. In some implementations, the first user identifier is established after a user agrees to receive notifications corresponding to the first web application.

Further, the application server may be authenticated using a client identifier and a whitelist. The server may provide to the at least one of a plurality of computing devices associated with the first user identifier, instructions to display graphical representations of multiple web applications associated with an account related to the first user identifier. The server may provide to the at least one of a plurality of computing devices associated with the first user identifier, instructions to display a graphical indicator adjacent a graphical representation of the first web application, wherein the graphical indicator includes a plurality of characters from the notification. In some implementations, the plurality of characters may include a text message specifying other users interacting with the first web application at a given time.

The graphical indicator may be automatically displayed when a user accesses a second computing device associated with the account. Upon detecting a hover of a pointer over the display of the graphical indicator from the at least one of the plurality of computing devices associated with the first user identifier, the server may provide instructions to display additional text from the notification without launching the first web application.

The graphical indicator may be automatically displayed without launching the first web application. The graphical representations of web applications, the graphical indicator, and the graphical representation of the first web application may be displayed in a web browser. The notification may be synced with a plurality of computing devices associated with the user identifier based on an account associated with the user identifier. Additionally, the notification may trigger a sound. The notification may include instructions to display a pop-up window in a display. The notification may be received at the at least one of the plurality of computing devices when the at least one of the plurality of computing devices is operating in a low power mode.

According to another general aspect, a tangible computer-readable storage medium having recorded and stored thereon instructions that, when executed by a processor of a computer system cause the computer system to establish an open network connection between a plurality of computing devices and a server. The computer system may establish a first user identifier corresponding to a user of at least one of the plurality of computing devices that has installed a first web application, receive a request from an application server to provide a notification related to the first web application authenticate the application server, after authenticating the application server, receive the notification and the first user identifier from the application server, and send a message from the server to the at least one of the plurality of computing devices when the request from the application server to provide the notification related to the first web application is received at the server.

Implementations may include one or more of the following features, alone or in combination with each other. The instructions further cause the computer system to provide, to the at least one of the plurality of computing devices, instructions to display graphical representations of web applications associated with an account related to the user identifier, and provide, to the at least one of the plurality of computing devices, instructions to display a graphical indicator adjacent a graphical representation of the first web application, wherein the graphical indicator includes a plurality of characters from the notification. In some implementations, the graphical indicator is automatically displayed when a user accesses a second device associated with the account. In some implementations, upon detecting a hover of a pointer over the display of the graphical indicator from the at least one of the plurality of computing devices, the instructions specify to display additional text from the notification without launching the web application.

Notification object state changes may be synced so that when a user closes the notification on a browser instance of the at least one of the plurality of computing devices, it disappears on all browser instances of each of the multiple computing devices associated with the account.

According to yet another general aspect, a system includes a memory configured to store executable code, and a processor operably coupled to the memory. The processor is configured to execute the code to receive a request from a developer of a first web application to provide a notification corresponding to the first web application. The processor is configured to execute the code to authenticate the developer using a client identifier, and after authenticating the developer, receive a content of the notification and a first user identifier, and provide the content of the notification to at least one of a plurality of computing devices associated with the first user identifier, based on an account associated with the first user identifier.

Implementations may include one or more of the following features, alone or in combination with each other. The processor is further configured to execute the code to provide, to the at least one of the plurality of computing devices associated with the first user identifier, instructions to display graphical representations of web applications associated with the account, and provide, to the at least one of the plurality of computing devices associated with the first user identifier, instructions to display a graphical indicator adjacent a graphical representation of the first web application, wherein the graphical indicator includes a plurality of characters from the content of the notification.

The graphical indicator may be automatically displayed when a user accesses a second device associated with the account. Additionally, notification object state changes may be synced so that when a user closes the notification on a browser instance of the at least one of the plurality of computing devices, the notification disappears on a second browser instance of the second device associated with the account. Still further, the processor may be further configured to execute the code to provide, to the at least one of the plurality of computing devices associated with the first user identifier, instructions to display additional text from the content of the notification without launching the web application, upon detecting a hover of a pointer over the display of the graphical indicator from the at least one of the plurality of computing devices associated with the first user identifier.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

A web browser executed by a client device can receive code (e.g., HTML code) from a remote server (e.g., a remote server that hosts a website) and can execute the receive code on the client device for the benefit of a user of the client device.

In various embodiments, the web browser may include or be associated with one or more web applications. In this context, a "web application" may be configured to a single task or multiple tasks for a user. In such an embodiment, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various embodiments, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run standalone, like any regular website.

Web browser extensions and applications can be downloaded for installation in and execution by a browser running on a client computing device. Web browser extensions and applications may affect how a browser performs. When multiple extensions or applications are in use, a user may have a difficult time determining which extension or application is to blame for poor browser performance. Systems and methods consistent with certain embodiments assist with measuring performance issues and making users aware of which web extensions or applications to blame for the performance issues. Data about performance issues may be gathered from individual users, stored at a server, and analyzed for individual users, or for groups of users.

Push Notifications

Push technology is a style of Internet-based communication where a request for a given transaction is initiated by a publisher or a central server. This is in contrast with pull technology, where a request for transmission of information is initiated by a receiver or client. HTTP server push (also known as HTTP streaming) is a way to send data from a web server to a web browser. HTTP server push can be achieved by several techniques. In some cases, a web server does not terminate a connection after response data has been served to a client. The web server leaves the connection open so that if an event is received, it can immediately be sent to one or multiple clients. Otherwise, the data would have to be queued until the client's next request is received. Push notifications may use a constantly-open IP connection to provide notifications from servers (e.g., notifications related to third party web applications or browser extensions) to client computing devices (e.g., smart phones used by users who have installed the web applications or browser extensions). The notifications may include sounds, images, or custom text alerts, for example.

An active notification may include a feature to immediately alert a user, such as a sound alert, a desktop alert, a pop-up window, or animation. Passive notifications, in contrast, may operate in a background of a web browser for example. A passive notification may include an indicator or information shown in a web browser, such as near a web application icon in the browser. As an example, a graphical icon representing a chess game application may include next to it a message that a good friend of a user is using the application right now, which may entice the user to launch the chess application and join in a game with his/her friend. As another example, a game developer may provide a notification in association with an icon representing the game, where the notification indicates that a new level of the game is available, or that an activity in a game is awaiting a user action, which may entice many users to launch the game (e.g., Farmville shows "Time to water your plant."). As yet another example, a group purchase application may provide a notification in association with an icon representing the application to indicate that a new deal is waiting for a user (e.g., "Free haircut at Super Cuts."). As still another example, a store application may show an alert that "Your packaged got shipped. Track it here." Passive notifications may entice a user to re-engage with an application.

User Accounts

A user account allows a user to authenticate to system services (e.g., web applications) and receive authorization to access them. To log in to a user account, a user may authenticate herself with a password or other credentials for the purposes of accounting, security, and resource management, for example. Once the user has logged on (e.g., to a web browser, to a computing device, etc.) an operating system may use an identifier such as an integer to refer to the user, rather than a username. For example, the username may be correlated with a user identifier. A system may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

A unique identifier in the context of identity correlation may be any identifier that is guaranteed to be unique among all identifiers used for a group of individuals and for a specific purpose. Unique identifiers may be serial numbers assigned incrementally, random numbers selected from a number space much larger than the maximum (or expected) number of objects to be identified, names, or codes allocated by choice but verified as unique. Unique identifiers may be used to sync web applications, browser extensions, and notifications among various computing devices accessible to a user.

Figure 1:
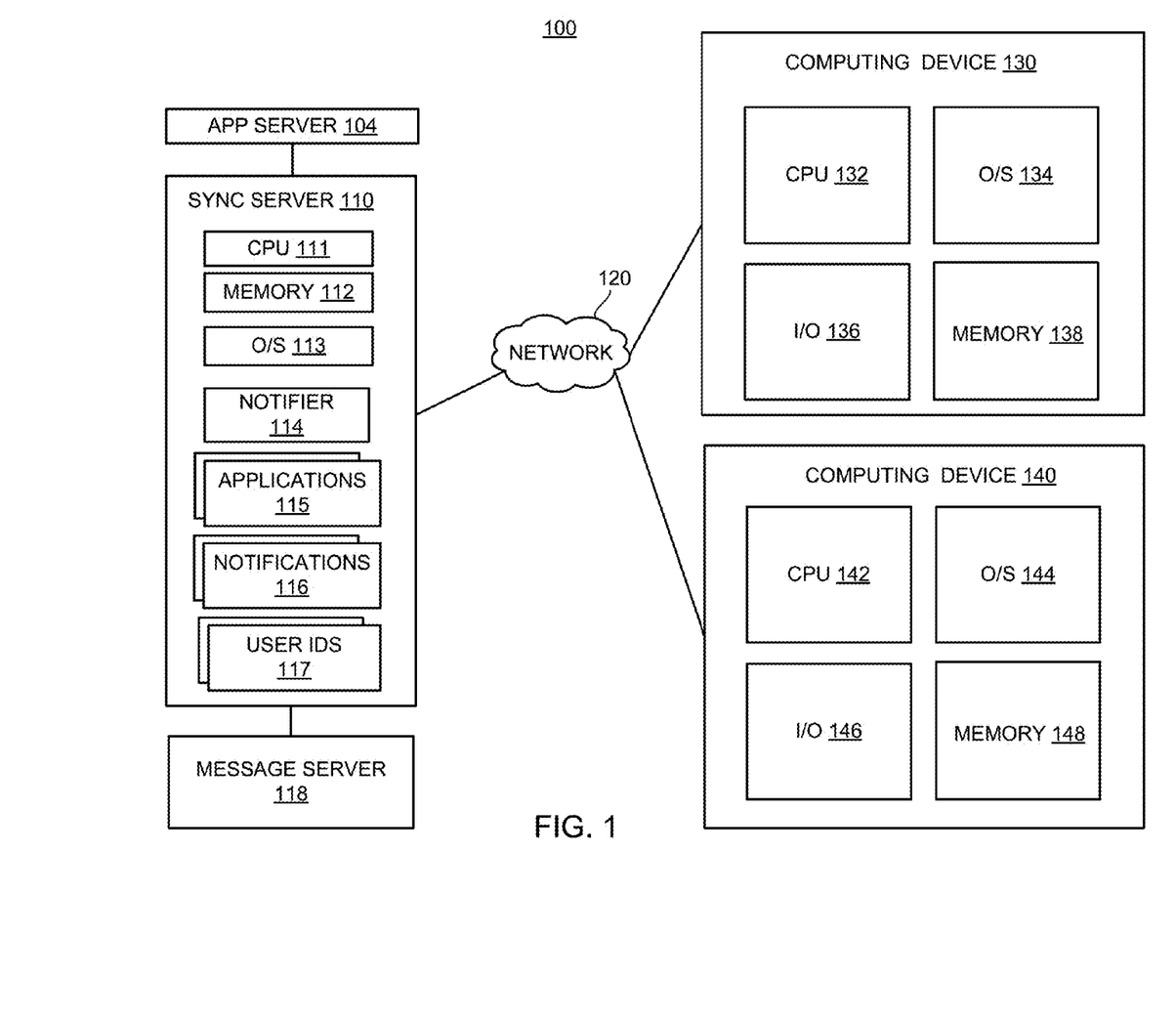
FIG. 1 illustrates an exemplary system for providing notifications for web applications and browser extensions.

FIG. 1 is a block diagram of a computing network 100 in accordance with an example embodiment. The network 100 may be used to provide notifications for web applications and browser extensions using the techniques described herein. The depiction of network 100 in FIG. 1 is shown by way of example. It will be appreciated that other network configurations may be used for implementing such techniques.

The network 100 includes an app server 104, a sync server 110 and computing devices 130 and 140. App server 104 may be one or more developer servers that provides web applications, browser extensions, or other applications to a digital marketplace, such as a web store. Sync server 110 may be a central server including a central processing unit (CPU) 111, memory 112, operating system (O/S) 113, notifier 114, applications 115, notifications 116, and user IDs 117. CPU 111 may be any general processor, and O/S 113 may be one of many operating systems. Memory 112 may be one or more storage devices configured to store information used by CPU 11 to perform certain functions. Notifier 114 may correlate applications 115, notifications 116, and user IDs 117, as described in more detail below with respect to FIG. 2. Applications 115 may include one or more web applications, browser extensions, or other applications. Notifications 116 may include one or more notifications related to one of applications 115, as described in more detail below with respect to FIG. 2. User IDs 117 include user identifiers corresponding to user accounts, such as user accounts associated with applications 115 that are accessible via web browsers. Sync server 110 may sync user accounts over network 120 using user IDs or other login credentials. As an example, a single user may access one of applications 115 from computing device 130, and at another time may access the same application from computing device 140. Sync server 110 may validate the user's login credentials (e.g., via a web browser) to allow the user to access the application (e.g., a hosted web application) from the different computing devices. One advantage of using a user identifier in place of a device identifier, for example, is that users may automatically receive notifications for all web applications, browser extensions, etc., at all computing devices the user accesses with the user ID or other login credentials, rather than at just one specific device (e.g., a phone where the user installed an application).

When a packaged web application has been installed, computing device 130 may locally store some data related to the packaged web application. Sync server 110 may ensure that local data from computing device 130 is synced across all of a user's devices or all devices that are used to log the user into a user account. Additionally, passwords traditionally are stored locally, but can be synced across devices using sync server 110. Further, sync server may sync across different devices all installed web applications, browser extensions, browser bookmarks, settings, profiles, browser history, themes, plugins, local permissions, and data associated with the web applications and browser extensions for a user. For example, if a user of computing device 130 accesses a user account (for example, via a web browser) from computing device 140, sync server 110 may copy settings and data associated with web applications and browser extensions (for example, that the user has selected to sync) from the user account to computing device 140. Changes to settings on one computing device may be automatically copied (e.g., via sync server 110) from other computers (for example, if the user has enabled that sync feature). Synced data may be encrypted when it travels between computing devices 130, 140, and sync server 110 to keep information secure. Further, passwords may be encrypted on computing devices 130, 140, and sync server 110 using a cryptographic key. Push notifications related to installed web applications may also be synced across different computing devices, and local data specifying how notifications related to the installed web applications are presented may also be synced across different computing devices, as described in more detail below related to FIGS. 2-4. Synced data related to push notifications may also be encrypted or otherwise protected to ensure user privacy.

The computing devices 130 and 140 may take the form of a number of different devices, such as a personal computer, laptop computer, tablet computer, netbook computer, or a web-enabled phone, as examples. The devices 130 and 140 may each include a browser that may be used to access various types of content. Such content may include web sites, photos, video, audio and executable scripts, and applications 115, for example. Computing devices each include a CPU (132, 142), O/S (134, 144), I/O (136, 146), and memory (138, 148). CPUs 132 and 142 may be any general processor, and O/S 134 and 144 may be one of many operating systems. I/O 136 and 146 may be one or more devices used to communicate with computing devices 130 or 140, such as a keyboard, pointer, mouse, liquid crystal display (LCD) monitor, touch screen display, web camera, printer, modem, network card, etc. Memory 138 and 148 may be one or more storage devices configured to store information used by CPU 132 or 142 to perform certain functions.

In the network 100, the computing devices 130 and 140 are coupled with a network 120. The network 120 may include a data access network that provides access to the Internet and/or the World Wide Web. Via the network 120, computing devices 130 and 140 (using browsers, for example) may communicate with the sync server 110 (e.g., a web application server or web store).

In one implementation, the sync server 110 may be configured to receive requests from user computing devices (e.g., computing devices 130 and 140) for installation of web applications and browser extensions, and to provide, in response to such requests, installation procedures (or installation packages) for the web applications or browser extensions. Such installation procedures/packages may include, at least, a client-side component for a requested web application or browser extension.

In the arrangement shown in FIG. 1, a web browser may be used to request installation of the web applications 115 and browser extensions by interacting with the sync server 110. For instance, the sync server 110 or another server may implement a website (e.g., an e-commerce site) that is used to distribute web applications, among other content. The server may acquire web applications and browser extensions from developers.

Requests to install web applications may be included in messages from the computing devices 130 and 140 to the server that indicate agreement to purchase respective web applications. In other implementations, the server may take other forms or implement other techniques, such as providing access to free web applications, or may take the form of a developer's website which provides access to web application installation procedures/packages.

The specific actions performed when installing a web application may vary depending on the particular implementation and/or the particular web application. In an example implementation, installing a web application may include installing an icon that corresponds with the web application in an application launcher area of a web browser application. A user may then interact with this icon to launch the web application. In another example implementation, installing a web application may include syncing the web application across multiple computing devices (e.g., mobile phones, smart phones, tablets, laptops, desktops) that a user accesses, for example from different locations at different times (e.g., using the same login credentials).

In other implementations, installing a web application may include starting a background page for the web application, if the web application includes a background page feature. A background page of a web application may enable the web application to run as soon as the user logs into their computer, including before the user launches a web browser application or launches the associated web application in the web browser application. A background page may an invisible element running in a browser application, where the background page includes a declared association, in the web browser application, with the installed web application.

While network 100 illustrates only a single sync server 110 and only two computing devices 130 and 140, it will be appreciated that any number of additional sync servers, digital marketplaces, servers, computing devices, or origins of web applications and browser extensions may be included in network 100.

Push notifications for installed web applications may be synced across different computing devices, and local data specifying how notifications related to the installed web applications are presented may also be synced.

In certain implementations, for example when a user is logged in to sync, an open network connection may be established to the sync server 110. When new data arrives on the sync server side that needs to be pushed to a user (e.g., a notification), a message server 118 pushes a message to a client computing device (e.g., computing devices 130, 140), causing the client computing device to begin a conversation with the sync server 110 about what new data it needs to pull down.

Figure 2:
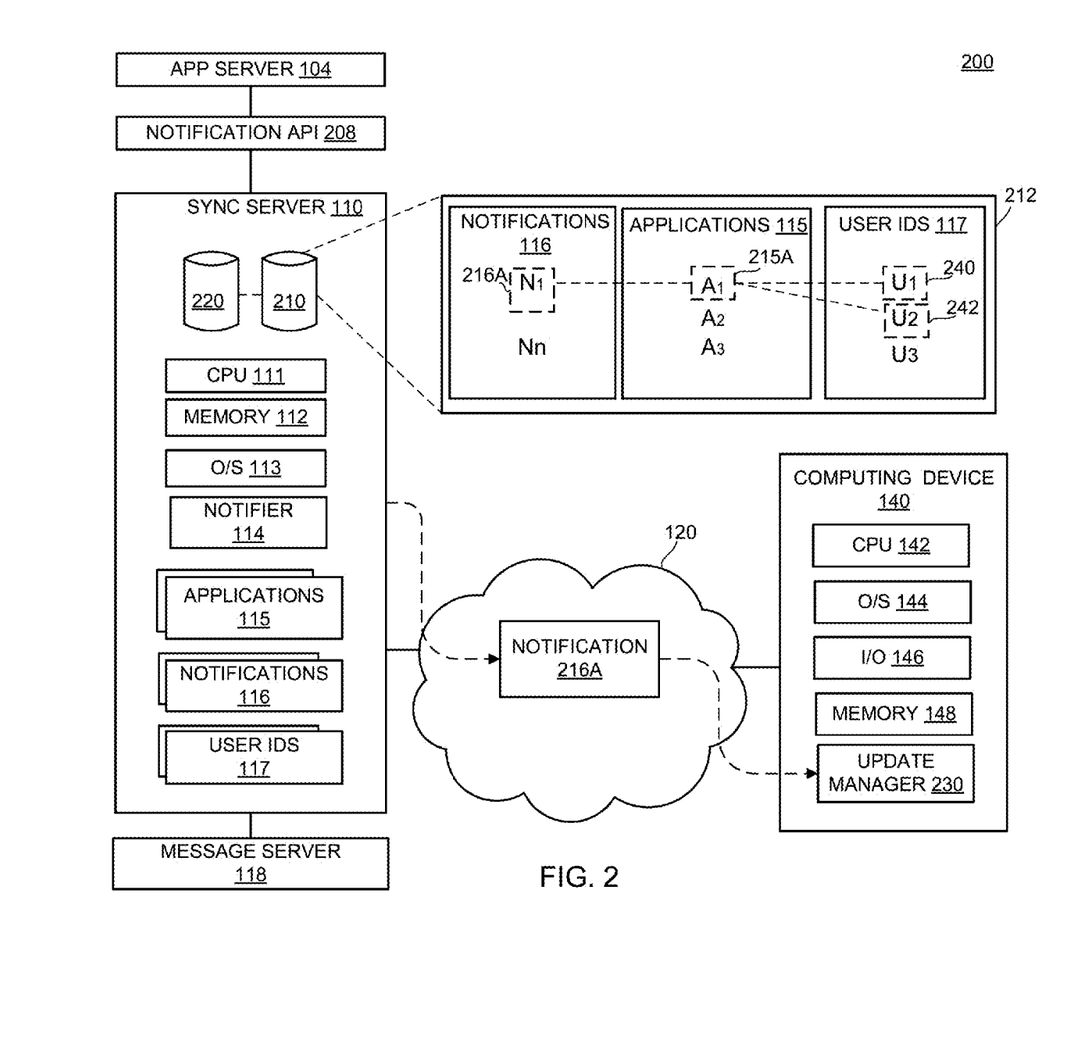
FIG. 2 is a block diagram of a system for distributing notifications for web applications and browser extensions.

FIG. 2 illustrates an exemplary system for distributing notifications for web applications and browser extensions in accordance with the disclosed subject matter. An App Server 104 may provide notifications to sync server 110, for example using a notification API 208. For example, if a developer decides he want to use notifications for a web application, the developer may use an API access console to get access to a server side API, and during that process register an identifier for the developer's account, which may be used to provide notifications to certain users that have installed the web application and have opted to receive notifications, as described in more detail below with respect to FIG. 3.

As shown in FIG. 2, sync server 110 may include a database 210. Database 210 may include a data table 212 (e.g., data structure, table, etc.) including references to notifications 116, applications 115, and user IDs 117. The data table 212 may store tuples (user ID, application, notification). Alternatively or additionally, database 210 may store a portion of notifications 116, applications 115, and user IDs 117. In some implementations, sync server 110 may also include a permissions database 220, which may store grants of permissions, and associations between users and the permissions. A user may establish, modify, or revoke grants of permissions at any time. As an example, a user may grant a permission to a third party application to send a notification. A tuple (user, app, notification) may be stored in the database 210 and/or database 220 to enable sharing and receiving notifications for certain applications. In certain embodiments, a user may approve a first application (e.g., an Amazon web application) to send notifications once a day, a second application to not send notifications, and a third application to send notifications only once.

Sync server 110 may receive a notification from app server 104, for example via notification API 208. App server 104 may represent a server of a developer of a web application that is registered with sync server 110 (e.g., one of applications 115).

In some implementations, notifier 114 may utilize data table 212 to determine which applications are associated with the notification. Notifier 114 may utilize data table 212 to determine which, if any, user IDs are associated with the identified applications (e.g., which users have installed the web applications).

For example, notifier 114 may receive notification "$N_1$" 216 from a developer of application "$A_1$" 215A. Using data table 212 from database 210, notifier 114 may determine that notification "$N_1$" 216 relates to application "$A_1$" 215A. Alternatively or additionally, notification "$N_1$" 216 may relate to multiple applications, and the developer may specify which application(s) each notification relates to when the developer provides the notification to sync server 110. Notifier 114 may determine (e.g., using data table 212) that application "$A_1$" 215A has been installed by users with the user IDs "$U_1$" 240 and "$U_2$" 242. Alternatively or additionally, app server 204 may specify which user IDs should receive the notification (e.g., which users have installed the application and have opted to receive such notifications). In some implementations, app server 204 may specify the user IDs for each notification when providing the content of the notification to sync server 110 (e.g., via notification API 208).

In some implementations, sync server 110 may provide notification 216A to each computing device associated with the identified user IDs (in this example, user IDS "$U_1$" 240 and "$U_2$" 242). For example, as shown in FIG. 2, sync server 110 provides notification 216A to an update manager 230 at computing device 140. In this example, computing device 140 is associated with user ID "$U_1$" 240. Update manager 230 may communicate with sync server 110 to verify the user ID, for example to ensure the notifications are sent to the correct user. Further, update manager 230 may be integrated with or interact with a browser application to display at least a portion of the notification 216A, as described in more detail below with respect to FIG. 3.

Update manager 230 may, in some implementations, receive notification 216A even if a browser application of computing device 140 is closed. Update manager 230 may also store a queue of notifications. Further, in some implementations, update manager 230 may receive notification 216A even when a browser application has a tab of a browser interface open to another web page, or when a user is viewing a blank tab of a browser interface.

Sync server 110 may send notifications automatically, as they are received or developed, or on a periodic basis. Sync server 110 may use an open network connection so that when new notifications arrive, message server 118 pushes a message (e.g., an invalidation message) to computing device 140, causing computing device 140 to begin a conversation with sync server 110 about what new data (e.g., notifications) it needs to pull down.

Notifications may be scheduled to be displayed by a user at a certain time (e.g., daily or hourly), or may be displayed when a user logs on to a computing device. Sync server 110 may make notifications available to any device associated with the user ID. For example, if a user has installed web application "$A_1$" 215A such that it is associated with its user ID, the user may receive the notification 216A at each device the user owns or accesses (e.g., tablets, smart phones, desktop computers, laptops, etc.). In some implementations, notification object state changes may be synced, so that when a user closes a notification on one browser instance, it disappears on all instances.

In some implementations, the user does not need to be running a web application or be viewing a web browser to receive notifications. If the user loses his laptop and then purchases a new one, the user may log on to a web browser using the new laptop and access the same applications and notifications without having to download or install the applications again. Alternatively or additionally, if the user installs a new operating system, the user may log on to a web browser using the new operating system and access the same applications and notifications without having to download or install the applications again.

In some implementations, sync server 110 may include with notification 216A data specifying how notification 216A is presented at computing device 140, as described in more detail below related to FIG. 3. For example, sync server 110 may include data specifying whether notification 216A is an active and/or passive notification, or how and when notification 216A should be displayed or provided (e.g., using sounds, animation, etc.).

In some implementations, a setup process may be used, for example to allow users to establish permissions and policies for notifications for each web application the user has installed. In such a way, the user may customize which applications, if any, may send the user notifications.

A developer may upload a web application to a digital marketplace (e.g., one of applications 115 shown in FIG. 1). The developer may decide he wants to use notifications for the web application, and the developer may use an API access console to get access to a server side API. The developer may register an identifier, i.e., a Client ID, which may later be used as an identifier for the developer's account. In some implementations, only whitelisted applications, developers, and/or app servers 104 may provide notifications to users. Client IDs may be used to establish whitelists and blacklists.

A user may launch the web application. The web application may ask the user to login to the web application's website, and the web application code may provide a user interface (not shown) offering to turn on notifications. If the user accepts, the web application may call a JavaScript API to setup notifications passing the Client ID. The setup JavaScript API may ensure the user is signed in to sync (prompting them to if they are not already), and then use the user's sync credentials to make a call to sync server 110. Sync server 110 may set up a User ID (e.g., one of User IDs 117 shown in FIG. 2), which may be an identifier for the user that the web application can use to send notifications to the user. This User ID may be returned as the result of the JavaScript API. The User ID may be provided to the developer's server, for example to be stored in a database at the developer's server (e.g., app server 104), which may be stored along with other data for that user's account. The User ID may be an anonymous identifier to ensure user privacy.

On a developer's computing device (e.g., developer servers, app server 104, etc.), if a developer wants to send a notification to the user, the developer may make a call to a sync server 110 (e.g., after authentication of the developer, for example using the developer's Client ID). The call may include the content of the notification and at least one User ID, which identifies which user(s) the notification is intended for. The sync server 110 puts the content of the notification into the sync backend data for the user, including which web application or browser extension (e.g., which of applications 115) the notification came from.

On the user's computing device, the sync code may get the notification content pushed to it, for example as with other data types, such as bookmarks, etc., and the notification can then be displayed on the user's computing device (e.g., computing device 140). For example, the notification can be displayed on a browser interface on a New Tab Page in a bubble above the web application's icon, in a pop-up window, or in any number of ways, as discussed in more detail below with respect to FIG. 3. Developers may send as many notifications as desired, and syncing may happen as many times as desired. Of course, users may customize how and when they receive notifications for each web application or browser extension they have installed or downloaded.

Figure 3:
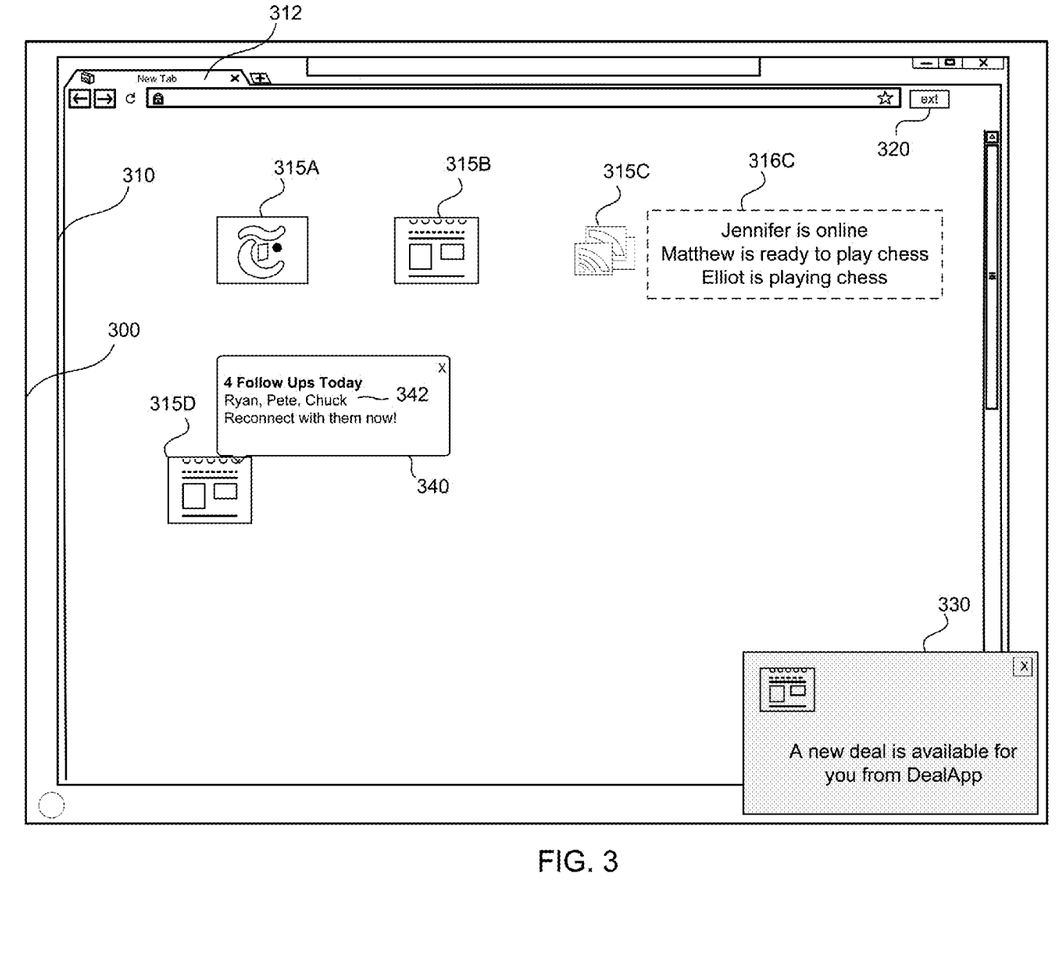
FIG. 3 illustrates a display including a user interface for a web browser.

FIG. 3 illustrates an exemplary display 300 consistent with embodiments described in this disclosure. Display 300 may be one of I/O 136 and 146 as shown in FIG. 1, for example. Display 300 includes user interface 310, which may be displayed by a browser application that is executed by a computing device that may be connected to a network (e.g., the Internet). The browser application may open one or more tabs 312.

User interface 310 includes indicators 315A, 315B, 315C, and 315D representing web applications (e.g., software applications that may be executed in a browser-controlled environment). User interface 310 may also include one or more indicators 320 representing browser extensions (e.g., software extensions for web browsers).

User interface 310 may also include passive notification 316C, which may be displayed adjacent indicator 315C, for example. In the example depicted in FIG. 3, passive notification 316C includes information about players of a web application game represented by indicator 315C. Passive notification 316C may include text related to the web application game represented by indicator 315C, e.g.: "Jennifer is online; Matthew is ready to play chess; Elliot is playing chess" as shown in FIG. 3. The depiction, text, and location of passive notification 316C as shown in FIG. 3 is merely for illustration and may include graphics or other information. Passive notification 316C may appear in the background of tab 312 and/or may appear adjacent to indicator 315C.

In some implementations, notifications may be active. For example, active notifications may include a pop-up window and/or sound alert. Active notification 330 is a pop-up window that includes an alert about the web application represented by indicator 315B, which states "A new deal is available for you from DealApp." Display 300 may temporarily display active notification 330 to alert a user about a notification for the web application 315B. Active notification 340 is a pop-up window that includes an alert about the web application represented by indicator 315D, which includes text 342. In some implementations, active notifications 330 or 340 may flash, change colors, or be accompanied by a sound, animation, or other feature to notify a user of an update related to a web application associated with the user's account.

In some implementations, a user may specify how notifications related to the installed web applications are presented. The specifications about how notifications are presented, which may be stored locally (e.g., on computing device 130), may also be synced to other computing devices accessible to the user, using sync server 110. For example, users may specify if they wish to receive passive notifications in the background, and for which applications they wish to receive passive notifications. Users may also specify if they wish to receive active notifications, how they wish to receive active notifications (e.g., using sounds, pop-up windows, desktop notifications, animation, flash, text, etc.) and for which applications they wish to receive active notifications or passive notifications. A process for enabling users to specify preferences for presentation of notifications is described above with respect to FIGS. 2B and 2C.

The information that is provided to or by notifications 316C, 330, and 340 (e.g., regarding who is using a web application, who is online, which users are subscribed to receive deal notifications, etc.) may be provided on an opt-in basis. In other words, such information may be provided from or to a server or a computing device only if users of the web application(s) or browser extension(s) specifically authorize the transmission of such information. In addition, data may be anonymized in one or more ways before it is sent, so that personally identifiable information is removed (e.g., using Channel IDs).

Notifications may be issued for any number of local reasons particular to the user of a computing device, which may be irrelevant to a general user. For example, a web application game may notify a user when the user's friends are playing the game online. Such notifications may be specific to a user and may not affect general users. Conversely, the user may ignore the notification if it is not relevant to the user. For example, if the notification indicates that new level is available for a game or that a new coupon is available for a group purchasing deal application, a user may ignore the notification. A notification may also be tailored based on user data (e.g., location, social map data, demographic data, usage patterns, etc.), but not particular to a certain user. For example, notifications may alert groups of a particular purchasing deal in a local area. A location of a computing device (e.g., computing device 130) may be determined based on a location associated with an Internet Service Provider (ISP) or based on a geographic positioning sensor. For example, a known location of an ISP may be used as an approximation or as a proxy for the location of the client computing device 130.

In some implementations, notifications may hook up to a native notification system (such as a system tray, taskbar, etc.). In those implementations, a user may receive notifications about web application without activating a browser application.

Figure 4:
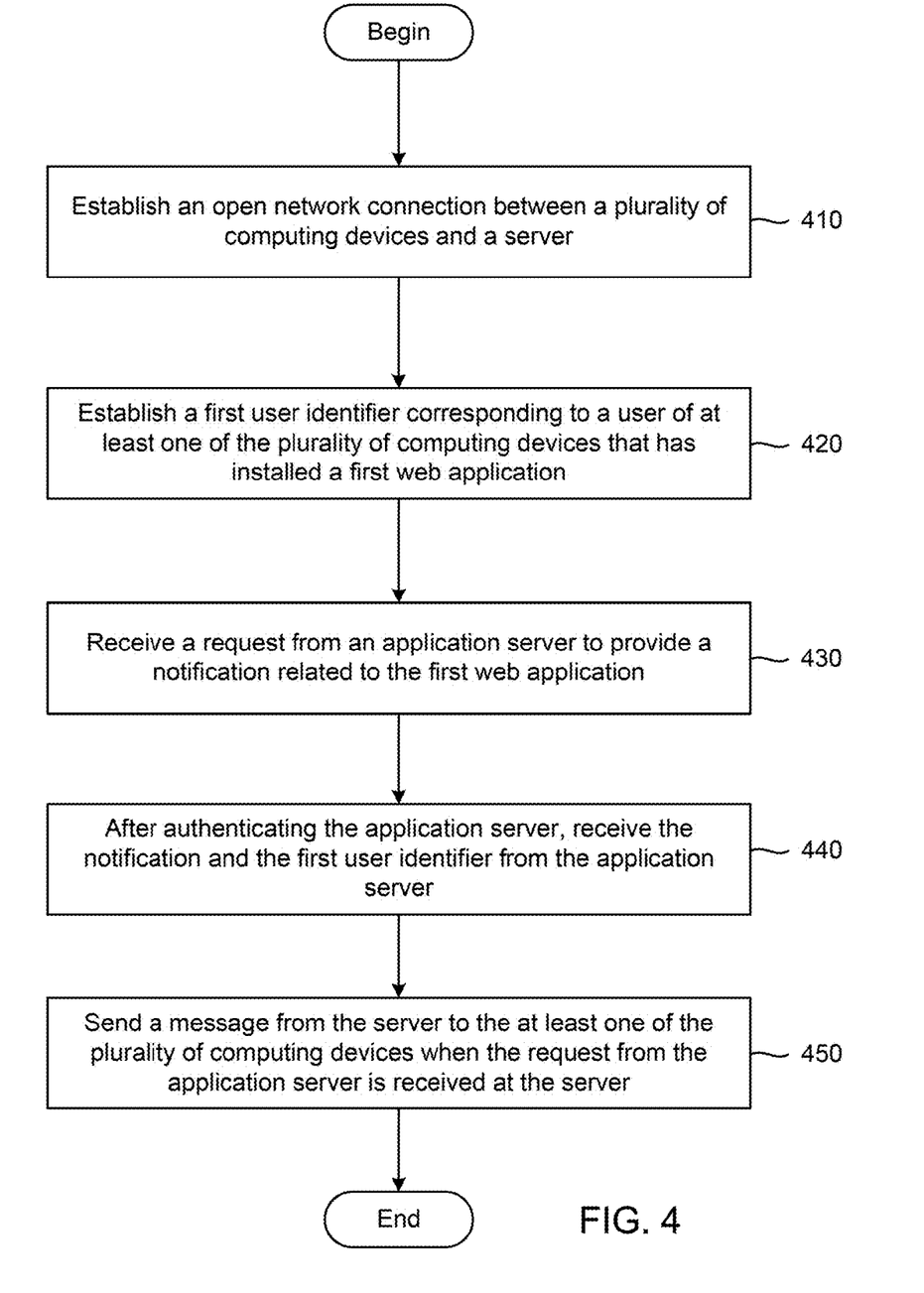
FIG. 4 is a flowchart of an exemplary process for providing notifications.

FIG. 4 illustrates a flowchart of a process for providing notifications. The flowchart shown in FIG. 4 may be performed at least in part by a server (e.g., the sync server 110 shown in FIG. 1). As shown in FIG. 4, a server establishes an open network connection between the server (e.g., sync server 110) and a plurality of computing devices (e.g., devices 130 and 140) (410). The server establishes a first user identifier corresponding to a user of at least one of the plurality of computing devices that has installed a first web application (420), for example one of user IDs 117. The server receives a request from an application server (e.g., application server 104) to provide a notification related to the first web application (430). After authenticating the application server (e.g., using a client ID and/or a whitelist), the server receives the notification (e.g., notification 216A) and the first user identifier from the application server (440). The server sends a message from the server to the at least one of the plurality of computing devices when the request from the application server is received at the server based (450). For example, the server provides the notification to at least one of web-enabled phone, laptop, and desktop of a user, using an account associated with the user ID. The process shown in FIG. 4 is an example of one implementation, and may have steps deleted, reordered, or modified. For example, the server may provide the notification to all computing devices associated with the plurality of user identifiers, or only to users that have opted to receive notifications for the web application. In other examples, the application server may not need to be authenticated. In still other examples, the first user identifier may be associated with the notification at the sync server 110, instead of having the application server 104 provide the first user identifier with the notification.

Figure 5:
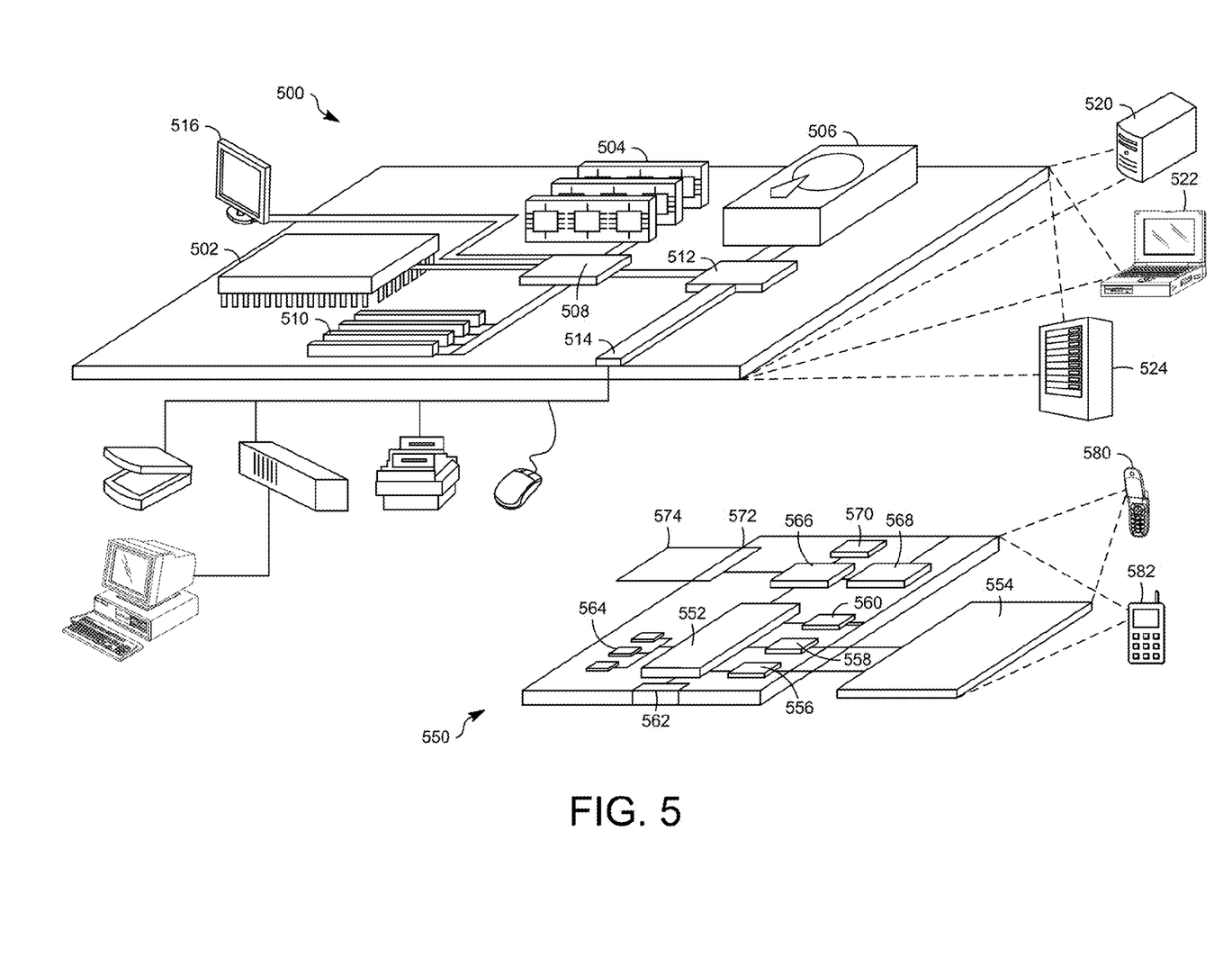
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a BLUETOOTH, WIFI, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for providing notifications, comprising:
   receiving, at a server, locally stored data of a first computing device from a plurality of computing devices, the locally stored data being associated with a web application installed at the first computing device and a user identifier;
   syncing the locally stored data with the plurality of computing devices;
   receiving, at the server, a request from an application server to provide a notification related to a web application;
   authenticating the application server;
   after authenticating the application server, receiving, at the server, the notification and the user identifier;
   providing, from the server, the notification to a second computing device from the plurality of computing devices associated with an account associated with the user identifier; and
   syncing the notification and the second computing device from the plurality of computing devices based on the locally stored data of the first computing device.

2. The method of claim 1, further comprising:
   establishing an open network connection between the second computing device from the plurality of computing devices and the server; and
   pushing a message from the server to the second computing device from the plurality of computing devices when the request from the application server to provide the notification related to the web application is received at the server.

3. The method of claim 2, wherein the user identifier is established after a user agrees to receive notifications corresponding to the web application.

4. The method of claim 1, wherein the application server is authenticated using a client identifier and a whitelist.

5. The method of claim 1, further comprising:
   providing to the second computing device from the plurality of computing devices associated with the account associated with the user identifier, instructions to display graphical representations of multiple web applications associated with the account associated with the user identifier; and
   providing to the second computing device from the plurality of computing devices associated with the account associated with the user identifier, instructions to display a graphical indicator adjacent a graphical representation of the web application, wherein the graphical indicator includes a plurality of characters from the notification.

6. The method of claim 5, wherein the plurality of characters includes a text message specifying other users interacting with the web application at a given time.

7. The method of claim 5, wherein the graphical indicator is automatically displayed when a user accesses the second computing device from the plurality of computing devices associated with the account.

8. The method of claim 5, further comprising:
   upon detecting a hover of a pointer over the graphical indicator from the second computing device from the plurality of computing devices associated with the user identifier, providing instructions to display additional text from the notification without launching the web application.

9. The method of claim 5, wherein the graphical indicator is automatically displayed without launching the web application.

10. The method of claim 5, wherein the graphical representations of web applications, the graphical indicator, and the graphical representation of the web application are displayed in a web browser.

11. The method of claim 1, further comprising:
    establishing, at the server, a plurality of user identifiers corresponding to users that have installed the web application.

12. The method of claim 5, wherein the notification triggers a sound.

13. The method of claim 5, wherein the notification includes instructions to display a pop-up window in a display.

14. The method of claim 1, wherein the notification is received at the second computing device from the plurality of computing devices when the second computing device from the plurality of computing devices is operating in a low power mode.

15. A non-transitory tangible computer-readable storage medium having recorded and stored thereon instructions that, when executed by a processor of a computer system cause the computer system to:
    establish an open network connection between a plurality of computing devices and an application server;
    establish a user identifier corresponding to a user of at least one of the plurality of computing devices that has installed a web application;
    receive, at the application server, locally stored data of a first computing device from the plurality of computing devices, the locally stored data being associated with the web application installed at the first computing device;
    syncing the locally stored data with the plurality of computing devices;
    receive a request from an application server to provide a notification related to the web application;
    authenticate the application server;
    after authenticating the application server, receive the notification and the user identifier from the application server;
    send a message from the application server to a second computing device from the plurality of computing devices when the request from the application server to provide the notification related to the web application is received at the application server, the second computing device from the plurality of computing devices to which the message is sent is an account associated with the user identifier; and sync the notification and the second computing device from the plurality of computing devices based on the locally stored data of the first computing.

16. The non-transitory tangible computer-readable storage medium of claim 15, wherein the instructions further cause the computer system to:

provide, to the second computing device from the plurality of computing devices, instructions to display graphical representations of web applications associated with the account associated with the user identifier; and provide, to the second computing device from the plurality of computing devices, instructions to display a graphical indicator adjacent a graphical representation of the web application, wherein the graphical indicator includes a plurality of characters from the notification.

17. The non-transitory tangible computer-readable storage medium of claim 16, wherein the plurality of characters is a text message specifying other users interacting with the web application at a given time.

18. The non-transitory tangible computer-readable storage medium of claim 16, wherein the graphical indicator is automatically displayed when a user accesses the second computing device from the plurality of computing devices associated with the account.

19. The non-transitory tangible computer-readable storage medium of claim 16, further comprising instructions that cause the computer system to:

upon detecting a hover of a pointer over the display of the graphical indicator from the second computing device from the plurality of computing devices, display additional text from the notification without launching the web application.

20. A system comprising:

a memory configured to store executable code; and a processor operably coupled to the memory, the processor configured to execute the code to:

receive, at a server, locally stored data of a first computing device from a plurality of computing devices, the locally stored data being associated with a web application installed at the first computing device and a user identifier;

syncing the locally stored data with the plurality of computing devices;

receive a request from a developer of a web application to provide a notification corresponding to the web application;

authenticate the developer using a client identifier;

after authenticating the developer, receive a content of the notification and a user identifier;

provide the content of the notification to a second computing device from the plurality of computing devices associated with the user identifier, based on the second computing device from the plurality of computing devices being associated with an account associated with the first user identifier; and sync the notification and the second computing device from the plurality of computing devices based on the locally stored data of the first computing device.

* * * * *